United States Patent [19]

Jones

[11] Patent Number: 4,860,202
[45] Date of Patent: Aug. 22, 1989

[54] IR DECODER SYSTEM

[75] Inventor: Gary A. Jones, Arlington Heights, Ill.

[73] Assignee: Zenith Electronics Corporation, Glenview, Ill.

[21] Appl. No.: 628,008

[22] Filed: Jul. 5, 1984

[51] Int. Cl.⁴ .................... G06F 7/02; H04N 5/44; G02F 1/00
[52] U.S. Cl. .................... 364/200; 455/603; 358/194.1
[58] Field of Search ... 364/200 MS File, 900 MS File; 455/603; 358/194.1

[56] References Cited

U.S. PATENT DOCUMENTS

| | | | |
|---|---|---|---|
| 4,143,368 | 3/1979 | Route et al. | 455/603 |
| 4,246,611 | 1/1981 | Davies | 358/194.1 |
| 4,318,130 | 3/1982 | Hener | 358/194.1 |
| 4,356,509 | 10/1982 | Skerlos et al. | 358/194.1 |
| 4,426,662 | 1/1984 | Skleros et al. | 358/194.1 |
| 4,514,732 | 4/1985 | Hayes, Jr. | 358/194.1 |

*Primary Examiner*—Gary V. Harkcom
*Assistant Examiner*—Christopher H. Lynt

[57] ABSTRACT

A microprocessor based infrared (IR) decoding system operating with binary data including data bits preceded by synchronizing bits has an input flip flop for triggering a counter responsive to a synchronizing bit and activating a latch type flip flop a predetermined time later for interrogating the data and storing the data bit. The counter also operates another flip flop which signals the microprocessor that a data bit is in the latch. The microprocessor is thus able to process the data in the latch in a time interval ending just before occurrence of the next data bit. The counter triggers the input flip flop to reset and rearm the counter before the next synchronizing bit.

6 Claims, 1 Drawing Sheet

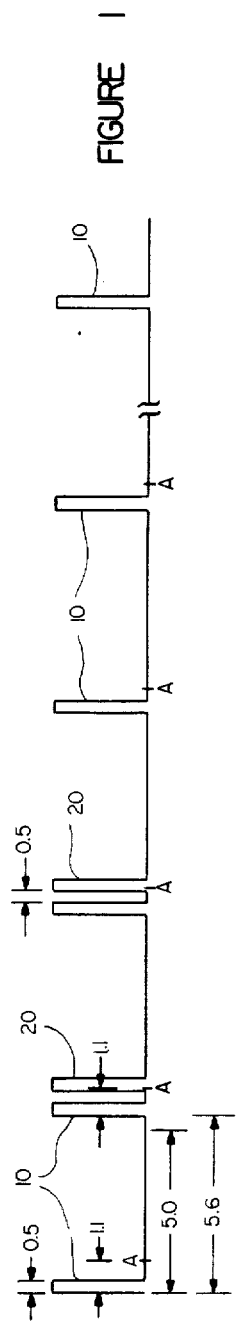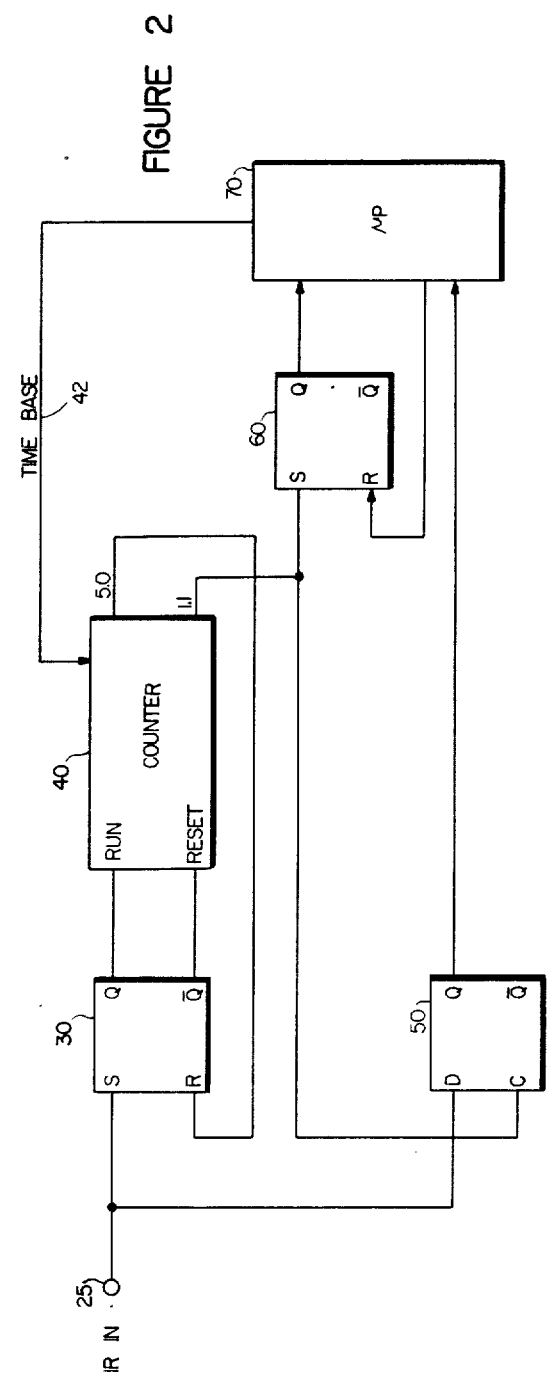

IR DECODER SYSTEM

BACKGROUND OF THE INVENTION AND PRIOR ART

This invention relates generally to decoder systems and particularly to television infrared (IR) light decoder systems that are microprocessor based.

In modern television receivers, many control functions are performed from a remote location by use of predetermined command signals from hand-held transmitting units. A popular type of control system uses bursts of IR light as the vehicle for the encoded signals, which are received by a suitable receiving device mounted on the television receiver. The television receiver may include a microprocessor for performing many receiver functions, such as tuning, in addition to decoding received IR coded command signals and generating appropriate control signals in response thereto. An IR encoded command signal generally consists of a binary data stream of given word length in which the presence of a burst of infrared energy represents a binary 1 and the absence of infrared energy represents a binary 0.

The demands on the microprocessor are quite extensive and when an IR remote command is received, the microprocessor must be available to decode the signal and generate the necessary control signal for performing the designated function. The present invention "unburdens" the microprocessor by enabling it to decode the signal in a greatly extended time period, thus enabling it to perform more tasks.

OBJECTS OF THE INVENTION

Accordingly, the principal object of this invention is to provide a novel microprocessor based decoding system and method.

A further object of this invention is to provide a decoding system and method that improves the operating efficiency of a microprocessor associated therewith.

SUMMARY OF THE INVENTION

In accordance with the invention, a microprocessor based decoder system for processing signals consisting of binary words having data bits preceded by synchronizing bits, includes means responsive to each synchronizing bit for temporarily storing each data bit, and means signalling the microprocessor that a data bit has been temporarily stored for enabling processing of the data bit by the microprocessor prior to occurrence of the next data bit.

BRIEF DESCRIPTION OF THE DRAWINGS

Further objects and advantages of the invention will be apparent upon reading the following description in conjunction with the drawing in which:

FIG. 1 depicts a typical data stream having binary encoded information; and

FIG. 2 is a block diagram of a decoder system constructed in accordance with the invention.

DESCRIPTION OF THE PREFERRED EMBODIMENT

Referring to FIG. 1, a data stream comprising a plurality of synchronizing bits 10 recurring at a regular repetitive rate is shown. It will be appreciated that the actual repetitive rate is a function of the design of the individual system. In the system incorporating the invention the data stream synchronizing bits have a repetition rate of 5.6 milliseconds, and the binary word length is 57.5 milliseconds to 79.9 milliseconds, depending upon the number of data bits transmitted. Each synchronizing bit 10 and its associated data bit 20 is 0.5 milliseconds in duration with the data bit occurring 0.5 milliseconds after the synchronizing bit. A minimum time interval of 40 milliseconds exists between the last bit in one binary word and the first bit in the next binary word. The presence of a pulse at the data bit position indicates a binary 1 and the absence of a pulse at the data bit position indicates a binary 0. As illustrated, the points labelled A mark a time equal to 1.1 milliseconds from the beginning of each synchronizing bit. These time points are selected to occur just after the beginning of each data bit 20 and, as will be seen, represent the sampling points at which the data stream is interrogated and the data bits are stored. After 5.0 milliseconds a timer (counter) is reset in anticipation of the next synchronizing bit.

Referring to FIG. 2, the representative data stream of FIG. 1 is presented to input terminal 25 and is supplied to the S terminal of an "RS" type flip flop (FF) 30 and to the D terminal of a "D" type FF 50. The Q and $\overline{Q}$ outputs of FF 30 are coupled to the "run" and "reset" terminals, respectively of a counter 40. A time base line 42 to counter 40 supplies a clock signal from a microprocessor 70 and serves to keep the counter in synchronism with the time base of the microprocessor. The Q output of FF 50 is coupled directly to microprocessor 70. This output supplies the data bits to the microprocessor for decoding.

Counter 40 has two outputs, one of which develops a pulse 1.1 milliseconds after FF 30 activates the "run" input and the other of which develops a pulse 5.0 milliseconds after activation of the "run" input. The 1.1 millisecond output pulse is supplied to the C terminal of FF 50 and to the S terminal of another "RS" FF 60, which has its Q terminal connected to microprocessor 70. FF 60 is an "interrupt" flip flop for signalling the microprocessor that a data bit has been received and needs to be processed in the microprocessor. A lead from microprocessor 70 is supplied to the R terminal of FF 60 for resetting FF 60 when the data bit in FF 50 has been processed and/or stored. Thus FF 50 functions as a latch to temporarily store the data bit when the data stream is interrogated.

In operation, the initial synchronizing bit operates FF 30, which starts counter 40 counting. When 1.1 milliseconds has elapsed, corresponding to the first point A in the bit stream depiction of FIG. 1, a pulse is supplied to clock FF 50 and the signal level existing at its D terminal is transferred to its Q terminal. Since at that point in the data stream, the data pulse is expected, its value is placed on the Q output terminal of latch 50. Thus the data bit is temporarily stored in the latch. The 1.1 millisecond output pulse from the counter also activates FF 60 which operates via an "interrupt" circuit in the microprocessor to signal the microprocessor that a data bit is in need of processing and to execute an appropriate program in memory. Since the data bit value is stored in latch 50, the microprocessor 70 has a substantial amount of time (until just before the next data bit) to execute the processing program. In the interim the microprocessor is free to perform other functions. The counter resets itself through FF 30 after 5.0 milliseconds and is then available for receipt of the next synchronizing bit 10 to reinitiate a counting cycle. Thus the counter is reset 5.0 milliseconds after each synchronizing bit. During the period when counter 40 is counting, with the exception of the precise time that the data stream is interrogated, noise in the data stream is prevented from influencing the decoding process. Therefore a high degree of noise immunity is inherent in the system of the invention.

What has been described is a novel microprocessor based decoding system that unburdens the microprocessor with respect to its timing for decoding incoming signals. It is recognized that numerous modifications and changes in the described embodiment of the invention will be apparent to those skilled in the art without departing from the true spirit and scope thereof. The invention is to be limited only as defined in the claims.

What is claimed is:

1. A microprocessor decoding system including a microprocessor comprising:
   means for receiving binary data in the form of a synchronizing bit followed a predetermined time later by a data bit;
   latch means, coupled to said receiving means, responsive to said synchronizing bit for temporarily storing said data bit; and
   means responsive to said latch means for signalling said microprocessor that a data bit is being temporarily stored to enable processing of said stored data bit by said microprocessor prior to occurrence of the next data bit.

2. The system of claim 1 wherein said latch means sample said binary data after said predetermined time when said data bit is present.

3. The system of claim 2 wherein said binary data is sampled immediately subsequent to the leading edge of said data bit.

4. The system of claim 3 wherein said latch means include a counter, and a latch supplied with said binary data, said counter activating said latch to sample said binary data and store said data bit.

5. The system of claim 4 wherein said counter is driven from said microprocessor and wherein said receiving means comprise an RS flip flop coupled to said counter and receiving said binary data, said counter resetting said RS flip flop just prior to occurrence of a subsequent synchronizing bit.

6. A microprocessor based decoding system for processing binary data in the form of synchronizing bits followed a predetermined time by data bits comprising:
   a counter in time synchronism with said microprocessor;
   a flip flop coupled to said counter and receiving said binary data for actuating said counter responsive to a synchronizing bit in said binary data;
   a latch receiving said binary data and being energized by said counter after said predetermined time during occurrence of a data bit for temporarily storing said data bit;
   means responsive to said counter for signalling said microprocessor when said data bit is stored; and
   said counter resetting said flip flop to reset said counter prior to occurrences of the next synchronizing bit.

* * * * *